United States Patent [19]

Penniman

[11] Patent Number: 4,530,019
[45] Date of Patent: Jul. 16, 1985

[54] SERVO PATTERN

[75] Inventor: Steven K. Penniman, Goleta, Calif.

[73] Assignee: DMA Systems, Goleta, Calif.

[21] Appl. No.: 616,839

[22] Filed: Jun. 4, 1984

[51] Int. Cl.³ .................... G11B 5/58; G11B 21/10; G11B 23/36
[52] U.S. Cl. ........................... 360/77; 360/135
[58] Field of Search ............... 360/77, 78, 135

[56] References Cited

U.S. PATENT DOCUMENTS

| | | | |
|---|---|---|---|
| 4,016,603 | 4/1977 | Ottesen | 360/135 |
| 4,400,747 | 8/1983 | Siverling | 360/77 |
| 4,424,543 | 1/1984 | Lewis et al. | 360/135 |
| 4,462,053 | 7/1984 | Lum et al. | 360/78 |

Primary Examiner—George G. Stellar
Attorney, Agent, or Firm—Spensley Horn Jubas & Lubitz

[57] ABSTRACT

A pattern, useful in providing data to a processing scheme to control the fine positioning of a transducer head of a disk drive unit, comprises an erased gap followed by an automative gain control (AGC) information burst followed by a first burst of servo control information followed by a second burst of servo control information. The pattern is written on a disk by the disk drive unit using a mechanical index on an armature associated with the rotation of the disk as a primary time reference, with all other time references being based on a transition between the erased gap and the AGC burst. The first and second servo control information bursts are written alternately off track by one half of the track separation between the track of interest and the next adjacent tracks to each side thereof. Decoding the pattern using a comparator circuit, comparing the servo control information waveform with the output ramp from an integrator circuit, digital positioned control data results to adjust the transducer to be centered on the track of interest.

4 Claims, 5 Drawing Figures

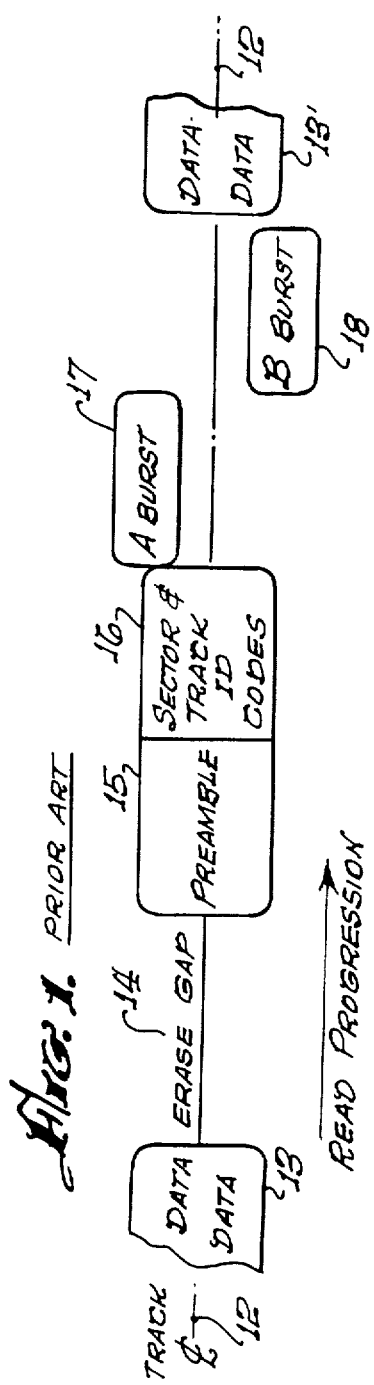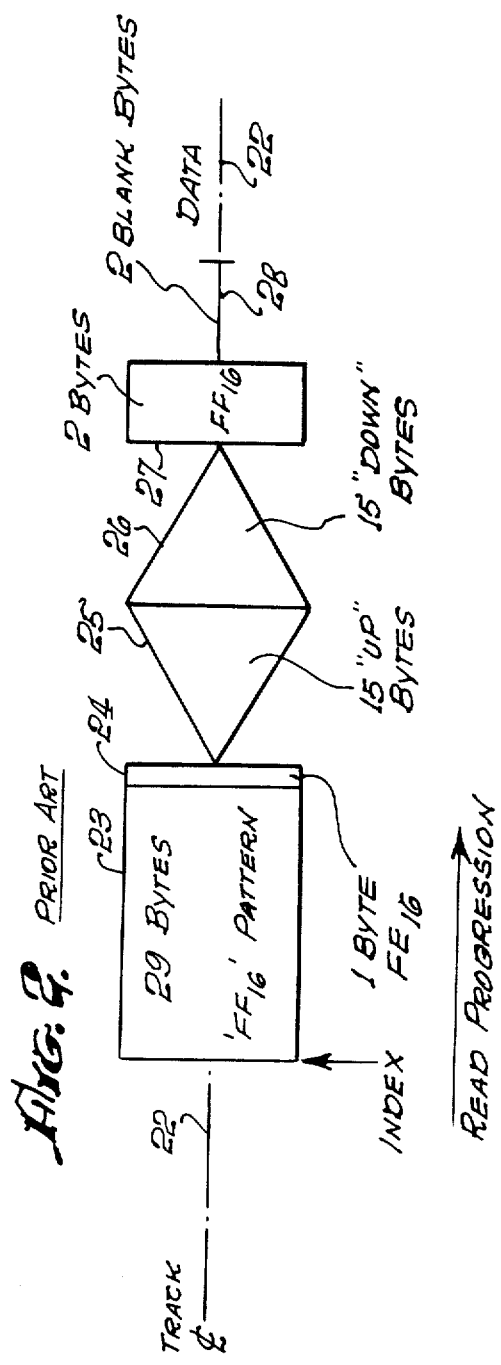

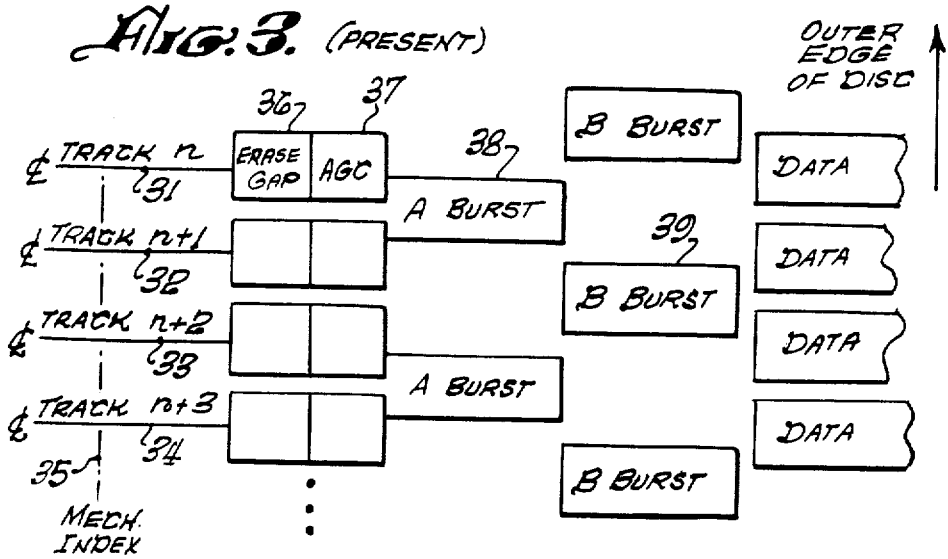
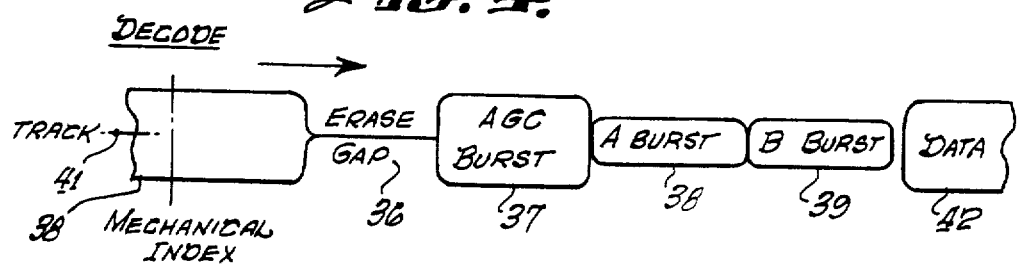
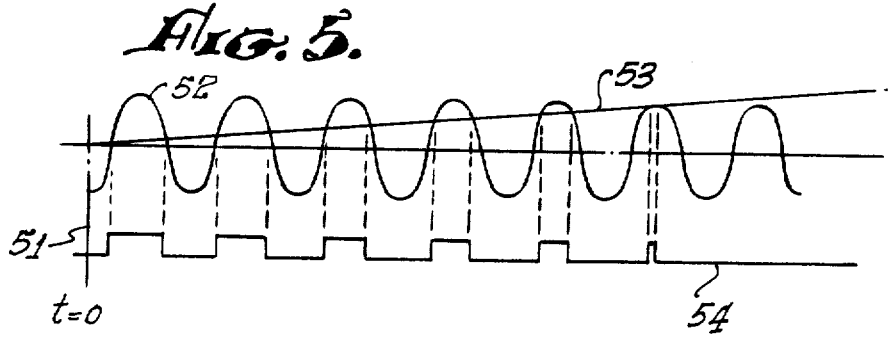

SERVO PATTERN

BACKGROUND OF THE INVENTION

1. Field of the Invention

The present invention relates to magnetic disks utilized for data storage and in particular to sector servo patterns written on the magnetic disks by the same write head as is used to record data thereon.

2. Discussion of the Prior Art

The methods and processes for storing information on a magnetic disk are well known in the art. Also well understood are the methods and associated hardware used to recover the information stored on a magnetic disk and to process this information into signals useful by equipment such as digital computers. In recovering the information, two factors are essential. First, a read head of a disk drive holding the disk from which the information is to be recovered must be positioned over the proper track on the disk at which the desired data to be recovered is stored. Second, modern efficient data storage techniques allow each track to contain more than one segment of data thus requiring the proper segment to be located. Several methods of accomplishing track and segment location have been practiced in earlier systems.

One such system locates the start of a data segment by writing a pattern on the disk which starts with an erased gap followed by a preamble of written zeroes followed in turn by sector and track identifier codes. Servo position information, used to maintain the read head centered on the track, is then written subsequent to the sector and track identifier codes. This servo position information consists of an "A" burst written off track by one-half the separation between adjacent tracks on the disk and a "B" burst written off track by one-half the distance separating the data track of interest and the next adjacent track to the side opposite that used for the "A" burst. The data segment, written on track, follows the "B" burst. Position information to control a servo mechanism driving the read head, to adjust its position over the proper track, is derived by integrating a half wave rectified waveform from both the "A" and "B" bursts. The integrated amplitude is stored in a sample and hold circuit and is then summed to form the control signal amplitude (A+B). An analog voltage resulting from the signal processor and corresponding to the signal difference (A−B) is fed to a positioning summing junction. A linear motor is driven by the output of the summing junction to reposition the head so as to keep both bursts equal in amplitude. An example of this form of sector servo pattern is shown in FIG. 1 of the drawings herein. A variant embodiment of this system uses a peak detector instead of integrating the signal amplitudes of the "A" and "B" bursts. This alternate embodiment is very sensitive to the amplitude of the largest pulse within the bursts.

The preceding system is useful in that it is self-triggering, that is, the erase gap is used to locate the pattern on the disk. Additionally, the pattern contains track identification information as well as the position information. The pattern is written as a series of three "macro" steps. Referring to FIG. 1, an "A" burst is first written offtrack. The write head is then positioned on track and the erase gap preamble and identification codes are written. Finally, the write head is repositioned an additional one-half track and the "B" burst is written. Data is then entered by returning the write head to the "on track" position. Accurate timing can be achieved by detecting the transition from the erase gap to the preamble, which establishes the time for the end of the "B" burst.

This system generally requires that extra care be taken when writing the identification information so that it can be read "off track". In the described embodiment, two write heads are utilized. One write head serves to write a clock track to identify the start of the erase gap and the other write head, positioned so that the clock track overlaps the written codes, writes the pattern as described above. Both the integrating and peak detector processing schemes utilized in the above result in analog information which requires extensive circuitry, including analog to digital conversion means, to enable the information to be used by a data processor. This results in high circuit complexity, large space requirements for circuit boards, and high cost.

A differing servo pattern has been proposed as given by the ANSII proposal X3B7/1983-B, January, 1983. This pattern is depicted in FIG. 2 of the drawings herein. It is described as a pattern having a preamble of 29 bytes each of FF (base 16) followed by a single byte of FE (base 16). This preamble is followed by 15 bytes of 84 (base 16), termed the "up count", followed in turn by 15 bytes of 82 (base 16), termed the "down count." Two additional bytes of FF (base 16) and then two bytes written as blanks complete the pattern. The start of the pattern is located by a mechanical index placed on a armature plate and sensed by appropriate transducer means. The preamble supplies a synchronizing clock signal for the decoding of the pattern. The up counts and the down counts are self-identifying and each subsequent byte is displaced slightly farther off track than the preceding byte with the first up count byte being written on track. During the reading of the up counts and down counts, the amplitude of each up or down byte is compared to a reference using a single comparator circuit. When the read head is substantially following the center of the track, the count of the up bytes having an amplitude greater than the reference should be equal to the count of the down bytes having an amplitude greater than the reference. Any difference in count thus directly provides digitally coded information for track position. The start of the synchronizing preamble clock pattern provides an accurate timing point to establish the end of the servo pattern and the start of the data. The pattern can be self "write protected" by the mechanical index.

The pattern depicted in FIG. 2 requires an accurate location of a sensor which detects the mechanical index relative to the locations of the write head and read head. This pattern further requires that the write head have a microstepping capability to 1/16th of a track position. Additionally, a clock track timing reference must be given to write the pattern. Since there is only one mechanical index, only one pattern can be written per revolution. This further introduces potential error in reading a pattern written on a different drive having differing mechanical relationships. A further disadvantage can be observed in that relatively complex decoding circuitry is necessary to digitally identify the up and down counts.

SUMMARY OF THE INVENTION

It is an object of the present invention to provide a servo pattern that can be written by the disk drive used to enter data information on the disk.

Another object of the invention is to provide a servo pattern wherein index transducer tolerances and jitter can be ignored.

It is a further object of the invention to provide a servo pattern wherein a single timer may be used to encode and decode the pattern without resort to a separate clock track.

Another object of the present invention is to provide a servo pattern which may be decoded using a simple integrator and a single comparator to cancel offset, hysteresis and time delay.

A further object of the invention is to provide a servo pattern which can be located at any rotational location on the disk and which may include multiple servo patterns on the same track.

An additional object of the invention is to provide a servo pattern capable of being decoded to establish an automatic gain control useful in providing linearity in the decoding process.

Another object of the invention is to provide a servo pattern which may be write protected by timing from an index or from a previous pattern.

A further object of the invention is to provide a servo pattern capable of being decoded by integrated digital circuitry resulting in digital output servo information.

An additional object of the invention is to provide a servo pattern decoding scheme providing an increased noise immunity at low amplitudes than equivalent peak detector schemes or up/down schemes.

These and other objects of the invention are accomplished by providing a system in which a servo pattern accurately identifying the start of stored data on a disk and also giving read head positional information is written by the disk drive used to store data information on the disk. Based upon a mechanical index associated with the rotational position of the disk, the pattern of the present invention is written by synchronizing to the index, then delaying a convenient length of time to allow for transducer variation and then briefly erasing the disk to establish an erase gap. Immediately thereafter an automatic gain control (AGC) burst, generally consisting of a low transition density pattern, is written. This AGC burst may assume a variety of digital signal characteristics as long as the pattern allows "off track" overlap. Next, the write head position is moved "off track" by one-half track. The read function of the head is used to locate the transition between the erase gap and the AGC burst and, synchronized to the transition, an "A" burst of servo information having a well defined time increment is written and is followed by an equally long period wherein the disk is erased. The write head is then moved one-half track further and an erase gap and AGC burst combination is written as before. The write head is then positioned an additional one-half track where, in synchronization to the transition between the erase gap and the AGC burst, the disk is erased for a period of time equal to an "A" burst which is immediately followed by the writing of an equally long "B" burst of servo information. This process is repeated until all of the available tracks on the disk are written.

In use, the write head is then returned to the first track nearest the periphery of the disk and is then relocated one-half track nearer the periphery to enable writing a "B" burst servo information time increment either by writing the data sequentially during the writing cycle for the erase gap and AGC burst, allowing an appropriate synchronized time increment equivalent to the "A" and "B" bursts, or by locating the appropriate track after all servo information has been written and then using the transition between the erase gap and AGC burst to synchronize the start of data on that track. The primary embodiment of the invention envisions that a fully erased disk is available at the start of the process.

In order to decode the pattern, the transition between the erase gap and the AGC burst is located by the read head. The length of the erase gap and the length of the AGC burst need only be sufficient to identify them as such on the disk. This transition is used by a time-gated decode circuit to establish the time increment wherein the "A" burst of servo information is to be found, the time increment wherein the "B" burst of servo information is to be found, and to establish the end of the servo pattern. Additionally, the AGC burst waveform is input to an automatic gain control amplifier to establish a gain level for linear recovery of the burst amplitudes of the "A" and "B" bursts of servo information. At the appropriate time increment from the transition between the erase gap and the AGC burst when the "A" burst of servo information appears, the waveform from the read head is provided as one input to a comparator. The reference input to the comparator is provided from an integrator circuit which starts its integration ramp in synchronization with the established start of the "A" burst of servo information. By comparing the burst waveform to the integrator ramp, a pulse is generated for each transition of servo burst information whose amplitude exceeds the ramp. The number of pulses is counted by a counter circuit and will be in proportion to the burst amplitude for a given ramp integration rate. This process is then repeated to determine the pulse count for the "B" burst servo information. As the read head is displaced "off track", the relative amplitudes, and therefore the counts, will change for the "A" and "B" bursts of servo information. The pulses collected in the counter can then be read by a microprocessor which can perform the required calculations to determine the off track positioning of the read head in order to control a servo motor to reposition the read head directly on track.

BRIEF DESCRIPTION OF THE DRAWINGS

FIG. 1 is a block diagrammatic representation of the information contained along a portion of a track of a disk according to one embodiment of prior art;

FIG. 2 is a block diagrammatic representation of the information found along a portion of a track of a disk in accordance with the ANSII proposal of the prior art;

FIG. 3 is a diagrammatic representation of information placed on a portion of a number of sequentially adjacent tracks of a disk in accordance with the present invention;

FIG. 4 is a diagrammatic representation showing the sequence of information derived from a portion of a track on a disk during the decoding process; and FIG. 5 illustrates a typical waveform resulting from a read head during either an "A" or "B" burst of servo information, together with an integrator output and the resulting comparator pulse output, in accordance with the present invention.

DETAILED DESCRIPTION OF THE INVENTION

Common to both the prior art and the present invention is a substantially circular planar disk, bearing a magnetic medium on its planar surfaces. Such a disk may be installed in a disk drive unit, often peripherally associated with digital data processors, wherein information may be recorded onto to the disk by a write function of a read/write head of the disk drive. The disk is rotated about its centroid by the disk drive so that the planar surface of the disk passes in proximity to the read/write head associated with the disk drive. The read/write head is positionable along a substantially radial path across the disk surface in a controllable manner by a servo motor of the disk drive.

The information recorded on the planar surface of the disk generally includes track identification information and read/write head positional servo information in addition to stored data information. When the digital processor requires information stored on the disk, the processor generates command signals to the read/write head servo to position the read/write head to the approximate radial location of the appropriate track on the disk. The information recorded on the disk is then read by the read/write head and is processed by appropriate electronic circuitry to assure that the proper track has been located. Adjustments to the read/write head position are accomplished in response to the servo information found on the disk. When the proper track has been identified and the read/write head position has been corrected, the stored data is then read from the disk for use by the processor.

Referring now to FIG. 1, a block diagrammatic representation of the information stored on a portion of one of the tracks of a disk according to the first embodiment of prior art discussed above, is shown. Although depicted as a linear progession of information, in reality the center line of the track 12 forms a circle substantially concentric with the center of rotation of the disk. Thus, the linear presentation reflects an approximation of an arc segment of that circle. Assuming that the disk is rotating so that the track 12 is moving from right to left with respect to a read/write head maintained in a fixed position by the disk drive, at the conclusion of a data segment 13 in which data may be recorded, the disk has had recorded thereon, in sequence, an erase gap 14, a preamble 15, sector and track identification codes 16, an "A" servo burst 17 and "B" servo burst 18, followed immediately by the start of the next segment 13' wherein data may be recorded. Typically, in the embodiment of the prior art first described earlier, the disk is supplied to the user with the erase gap 14, the preamble 15, the sector and track identification codes 16, and the "A" and "B" servo bursts 17 and 18, respectively, prerecorded on the disk. In such prior art servo patterns, typically the "A" and "B" bursts are written in an off-track position centered substantially half way between the center lines of adjacent data tracks, with the "A" burst and "B" burst being situated on opposite sides of the center line of the data track with which they are associated. Thus, the disk drive in which the disk is to be used may identify the appropriate sector and track and then utilize the servo information to appropriately position the read/write head to record data. Such patterns are typically prerecorded on each track of the disk by a mechanically precise and expensive servo writer apparatus. Several rotational passes are normally required for the recording of each track's servo and identification information.

Recovery of the data thus written is accomplished in a similar manner. The read/write head is positioned, using the pre-recorded sector and track identification codes 16 to locate the desired track and, if appropriate, the proper sector on the track. Then the pre-recorded "A" and "B" servo bursts 17 and 18 are processed and the head is adjusted in position so as to force the signal from the "A" burst to equal that from the "B" burst, thereby ensuring that the read head is positioned on the track center line at the boundary between the "A" and "B" bursts. Then the read function of the read/write head of the disk drive reads the data 13 as the disk rotates from right to left, in the illustrated embodiment, past the head.

Referring now to FIG. 2, the proposed ANSII servo pattern is illustrated in a similar manner. A track centerline 22, again representing an arc segment of a track on a disk, is prewritten by a servo writer with the track identification and servo pattern as shown. Again reading from left to right, the equivalent of the disk rotating from right to left, the prewritten pattern consists of a sequentially recorded group 23 of 29 bytes of information each readable as FF in base 16. A 30th byte 24 is appended to the group 23 and is readable as FE in base 16. The leading edge of the group 23 serves as an index for the pattern. Servo information consisting of 15 bytes 25 each readable as 84 in base 16 and 15 bytes 26 each readable as 82 in base 16, follows thereafter. This servo information, identified in the ANSII system as "up" bytes and "down" bytes, is written by the special servo writer by progressively repositioning its write head by a changing distance off the center line of the track. When such a pattern is read, the signal peak amplitude varies in an up ramp followed by a down ramp. A constant amplitude threshold circuit then allows a count of pulses over the threshold to contain track location information. Next in sequence, two additional bytes 27 each readable as FF in base 16 signify the end of servo information. Prior to the start of a data recording segment, two blank bytes 28 are written onto the disk. The index, the leading edge of the group 23, is used to time the start of the data.

Referring next to FIG. 3, a servo pattern in accordance with the present invention is illustrated. It is to be noted that the practice of the present invention eliminates the requirement for a special servo writer apparatus, in that the servo patterns herein are produced by the same write head and the same disk drive as is used for recording data. The diagrammatic representation shows linearized portions of four adjacent tracks 31, 32, 33, and 34, respectively, located on a disk of the type being discussed herein. The track servo information to control the radial position of the read/write head of the disk drive is written on the disk in the following manner. A mechanical index is incorporated on the armature of the turntable of the disk drive which causes rotation of the disk within the disk drive. Appropriate conventional sensor means are available for detecting the rotational position of the mechanical index. Assuming for purposes of illustration that track 31 represents the first track at the periphery of the disk upon which data is to be written, the read/write head of the disk drive is appropriately positioned for that track. A digital processor (not illustrated) controls the read/write functions and maintains all appropriate timing within this process. As the sensor indicates the passage of the mechanical index, an initial time 35 is established. After a predetermined time increment, the digital processor causes the read/write head to write an increment 36 on track 31 of the disk which is totally erased. Immediately thereafter an AGC burst 37 is written. Both the erase gap increment 36 and the AGC burst 37 have known time duration. The read/write head of the disk drive is then repositioned inwardly along the radius of the disk by one-half of the distance between adjacent tracks 31 and 32. When the read function of the read/write head of the disk drive detects the transition between the erase gap increment 36 and the AGC burst 37, a timing delay is initiated to cover the increment during which the AGC burst 37 is present and then an "A" servo burst 38 of known time duration is written on the disk followed by an equal time increment of total erasure of the disk. This increment of total erasure serves to ensure that subsequent "B" servo burst information, described below, will not be compromised by noise signals. The read/write head is then again repositioned inwardly along the radius of the disk by one-half track separation increment to the location of track 32. Again, when the mechanical index has been sensed, the time delay is initiated and an erase gap and AGC burst equivalent to those of 36 and 37 are written on the disk.

The read/write head is then again repositioned inwardly along the radius of the disk by one-half track separation increment to a position equidistant between tracks 32 and 33. By again sensing the transition between the erase gap increment and the AGC burst just written on track 32, a time delay equivalent to the AGC burst is established and at the end of that time delay, the read/write head is caused to write an increment of total erasure of the disk equal in time to the "A" servo burst 38 followed by the writing of an equal time increment of "B" servo burst 39 information.

The read/write head is then repositioned to be centered on track 33 whereat the process for track 31 is repeated. By repositioning the read/write head by one-half track increments across the complete usable radius of the disk, each track will have written thereon an erase gap increment followed by an AGC burst and each track will be bracketed by "A" and "B" servo bursts. The read/write head is then repositioned to a position one-half track radially outwardly from the first track on the periphery of the disk where a "B" servo burst is written as described. The read/write head may then be positioned appropriately over each track and data to be stored may be written on the disk, using the transition between the erase gap increment 36 and the AGC burst 37 to establish the time for start of data on a given track.

More than one data segment may be written on a given track. To accomplish this feature, the time increment from the mechanical index initialization time 35 to the end of the data for the first segment on a track is established. Subsequently, a further erase gap increment, AGC burst, "A" servo burst, and "B" servo burst may be written as described above, followed by data.

As an alternate approach, each time the read/write head is positioned along one of the tracks, data may be written allowing an appropriate time increment from the end of the AGC burst 37 to accommodate the "A" servo burst and "B" servo burst information.

Referring now to FIG. 4, decoding of the pattern written on a given track 41 will be described. Using only the read function of the read/write head of the disk drive, when the read/write head reads the transition between the erase gap increments 36 and the AGC burst 37, timing functions are started to identify the time increment during which the "A" servo burst 38 information will appear, the "B" servo burst 39 information will appear, and the time of the start of the data 42.

Adjustment of the position of the read/write head to ensure tracking along the center of a given track is accomplished by utilizing the "A" servo burst 38 information and the "B" servo burst 39 information processed in the following manner. A typical comparator circuit (not illustrated) is mechanized to have one input be the signal waveforms sensed by the read/write head. The other input to the comparator circuit is the output from a typical ramp integrator circuit (not illustrated). Referring to FIG. 5, the comparator and integrator are initialized to start functioning at time 51 which is at an established time after the occurrence of the transition between the erase gap and the AGC burst of the pattern described above. A different time increment is established for each of the "A" servo burst information and the "B" servo burst information segments. The waveform 52 represents, as a first example, the input to the comparator from the "A" servo burst information. The ramp integrator is started at time 51 and presents an input to the comparator shown as the ramp 53. The output of the comparator is mechanized to be logic level pulses exhibiting a high signal whenever the amplitude of the waveform 52 exceeds the integrator ramp 53. The waveform 54 is representative of the logic level output of the comparator. A counter (not illustrated) is mechanized within the digital processor to count the number of high signal level pulses output from the comparator. By making the same comparison on the "B" servo burst information, restarting the ramp integrator at the appropriate time, a count of high logic level signal pulses for the "B" servo burst can be achieved. When the read/write head is appropriately positioned to be centered on the track being read, the number of counts achieved from processing the "A" servo burst should equal that from the "B" servo burst. Any difference in count indicates an error in the positioning of the read/write head which can be corrected by utilizing the digital count difference to generate signals to control the head positioning servo.

Inclusion of the AGC circuits (not illustrated) allows the AGC burst of the pattern to be monitored and retained for use to adjust the gain of the circuitry used to process the read transducer output of servo information and also data to accommodate variations in the disk storage media. This is particularly useful to provide noise immunity if the disk is to be read by a disk drive other than the one on which it was created.

While the invention has been particularly shown and described with reference to a preferred embodiment, it will be understood to those skilled in the art that various changes in form and detail, including substantial equivalents, may be made therein without departing from the spirit and scope of the appended claims.

I claim:

1. A method of initializing sector servo information on a disk storage media on a disk within a disk drive assembly, which assembly includes a mechanical index on an armature rotating said disk; means for sensing said mechanical index; a read/write transducer; means for controllably positioning said read/write transducer relative to said disk; means for selectively enabling either a read function or a write function of said read/write transducer; and comparator, integrator, and counter means for generating a digital servo control signal; said method comprising:

continously rotating said disk;

positioning said read/write transducer adjacent to the periphery of said disk and separated there from by at least one full width of a track to contain information to be written on said disk storage medium;

sensing said mechanical index and establishing an initial time therefrom;

momentarily delaying to accommodate mechanical index sensing errors;

fully erasing a track width of said disk storage medium for a fixed time increment;

writing on said disk a fixed time increment burst of automatic gain control information;

inwardly repositioning said read/write transducer by an increment one-half the width of a track;

using the read function of said read/write transducer to determine the transition between the erased increment and the AGC burst previously written to establish a time increment to the end of said AGC burst, whereon a first burst of servo control information is written, using the write function of said read/write transducer, for a known time increment and is immediately followed by an equal time increment of track erasure;

further repositioning said read/write transducer inwardly by an additional one-half track width increment, whereat another track erasure increment and AGC burst increment are written as previously described;

again repositioning said read/write transducer inwardly by one-half track width increment whereat the immediately preceding erased increment to AGC burst transition is used to establish a time for the end of said AGC burst, whereon track erasure is performed for a time increment equal to that of the previously written first servo control information burst followed by an equal time increment writing of a second servo control information burst;

successively performing the preceding sequence until all track positions of said disk storage media have been identified; and returning said read/write transducer to a position one-half track outwardly removed from the first track written, whereat a second burst of servo control information is written in the manner described.

2. A pattern of magnetically coded information written, on a track of a rotating disk bearing storage media by a write transducer of a disk drive unit, said unit including a mechanical index associated with the rotation of said disk and means for sensing the passage of said mechanical index, sequentially comprising:

an increment, delayed by a predetermined time from the sensing of said mechanical index, wherein said track is fully erased;

an increment of signal having a low transition density serving as an AGC burst;

a first increment of servo control information, written in a position centered along an arc located one half of the distance between the center line of said track and the center line of a next adjacent track; and a second increment of servo control information, having a time duration substantially equal to said first increment of servo control information, written in a position centered along an arc located one half of the distance between the center line of said track and the center line of a next adjacent track located opposite to the next adjacent track determining said first increment of servo control information.

3. A pattern of encoded information written on a track of a disk by a transducer of a disk drive unit, comprising:

an erased gap; followed sequentially by an increment of AGC information; followed sequentially by first increment of servo control information written off the center of said track by one half of the radial distance to a next adjacent track located to one side of said track; followed sequentially by a second increment of servo control information written off the center of said track by one half of the radial distance to a next adjacent track located to the opposite side of said track;

wherein said disk drive unit when operating in a read function mode, may decode said pattern to control the position of said transducer to be centered on said track by:

sensing a transition between said erased gap and said AGC information and using said transition as a time index to establish the start of said first increment of servo control information, the start of said second increment of said servo control information, and the start of subsequent data stored on said track;

enabling during the time of the first increment of servo control information, a substantially sinusoidal output from said transducer to be provided as one input of a comparator circuit;

starting an integrator circuit, generating a ramp output, at a time substantially equivalent to the starting time of said first increment of servo control information, said ramp output being input to a second input of said comparator circuit;

said comparator circuit then determining and retaining a count, in a counter circuit, of the number of waveforms of said substantially sinusoidal waveform that exceed said integrator ramp, said comparison continuing throughout the time increment of said first increment of said servo control information;

repeating said comparison, including restarting said integrator ramp, at substantially the starting time of said second increment of servo control information, retaining the resulting count;

adjusting the position of said transducer in accordance with any difference in count resulting from said first and said second increments of servo control information.

4. Means for decoding a servo control pattern written in accordance with the method of claim 3, comprising:

an integrator circuit, resetting and starting its integration upon receipt of a control signal, and providing an output ramp waveform;

a counter circuit; and a comparator circuit accepting a substantially sinusoidal waveform otuput from a read transducer of a disk drive unit as a first input thereto and accepting said output ramp waveform as a second input thereto;

said comparator circuit providing a pulse output to said counter circuit, starting upon receipt of said control signal, for each increment wherein said first input exceeds said second input;

said control signal first originating after a first time delayed increment following a transition between an erased gap and an AGC burst, which time delayed increment starts said ramp output from said integrator circuit during a first burst of servo control information of said servo control pattern;

said control signal next originating after a second time delayed increment following said transition to restart said ramp output during a second burst of servo control information of said servo control pattern;

whereby a difference in count resulting between said first burst of servo control information and said second burst of servo control information may be applied to a digital control circuit controlling the position of said read transducer.

* * * * *